United States Patent
Ozaki et al.

(10) Patent No.: US 6,803,458 B2
(45) Date of Patent: Oct. 12, 2004

(54) CELLULOSE ACETATES AND PROCESS FOR PRODUCING THE CELLULOSE ACETATES

(75) Inventors: Toru Ozaki, Niigata (JP); Hirofumi Sasai, Hyogo (JP); Hiroki Taniguchi, Hyogo (JP); Michiyo Nakai, Hyogo (JP); Shinsuke Suzuki, Hyogo (JP)

(73) Assignee: Daicel Chemical Industries, Ltd., Osaka (JP)

( * ) Notice: Subject to any disclaimer, the term of this patent is extended or adjusted under 35 U.S.C. 154(b) by 0 days.

(21) Appl. No.: 10/239,628

(22) PCT Filed: Mar. 27, 2001

(86) PCT No.: PCT/JP01/02478

§ 371 (c)(1),
(2), (4) Date: Sep. 20, 2002

(87) PCT Pub. No.: WO01/72847

PCT Pub. Date: Oct. 4, 2001

(65) Prior Publication Data

US 2003/0092906 A1 May 15, 2003

(30) Foreign Application Priority Data

Mar. 27, 2001 (JP) ........................................ 2000-086998

(51) Int. Cl.⁷ ............................................... C08B 3/06
(52) U.S. Cl. .............................. 536/69; 536/58; 536/71
(58) Field of Search ..................................... 536/69, 71

(56) References Cited

U.S. PATENT DOCUMENTS 4,439,605 A * 3/1984 Yabune et al. ................ 536/71

FOREIGN PATENT DOCUMENTS

| EP | 0146936 | * 12/1984 | ............. C08B/3/06 |
| JP | 56-059801 | 5/1981 | |
| JP | 2000-154202 | 6/2000 | |
| JP | 2000-212202 | 8/2000 | |

* cited by examiner

*Primary Examiner*—James O. Wilson
*Assistant Examiner*—Ganapathy Krishnan
(74) *Attorney, Agent, or Firm*—Flynn, Thiel, Boutell & Tanis, P.C.

(57) ABSTRACT

The present invention provides a cellulose acetate satisfying at least one requirement selected from the following requirements (A), (B) and (C), provided that the case where (B) alone is satisfied is excluded.

Requirement (A): Bright spotty matters in sizes of 20 $\mu$m or more are not more than 20 units/mm³.

Requirement (B): Blocking constant (K) is not more than 60.

Requirement (C): The ratio (G'/G") of storage modulus (G') to loss modulus (G") at a measuring frequency of 0.016 Hz is not more than 0.2.

10 Claims, No Drawings

CELLULOSE ACETATES AND PROCESS FOR PRODUCING THE CELLULOSE ACETATES

FIELD OF THE INVENTION

The present invention relates to cellulose acetate which, when dissolved in a solvent, produces an inconsiderable amount of fine insoluble matters and exhibits excellent filterability and to a process of making this cellulose acetate. More specifically, it relates to cellulose acetate which can reduce the risk of occurrence of optical defects of films due to leakage in filtration in the manufacture of films to be used in optical applications in particular and to a process for producing the cellulose acetate.

Further, the present invention relates to cellulose acetate which, when dissolved in a solvent, leads to a solution having an inconsiderable elasticity and excellent processability such as spreadable film casting and fiber spinnability and to a process for producing the cellulose acetate.

Still further, the present invention relates to cellulose acetate whose filterability and elasticity are all improved and to a process for producing the cellulose acetate.

PRIOR ART

Cellulose acetate includes cellulose triacetate and cellulose diacetate. Cellulose acetate is widely used in various applications such as films for photographic use, protective films of polarizing plates, fibers for clothing, cigarette filters, hollow fibers for artificial kidneys, etc.

When cellulose acetate is used in these applications, cellulose acetate is dissolved in an organic solvent and is thereafter formed into respective articles. For example, when cellulose triacetate is made into a film, a solvent cast process, comprising casting a concentrated solution (dope), which is prepared by dissolving cellulose acetate in a solvent such as methylene chloride, onto a support (drum, band, etc.) whose surface is finished in a mirror polished state, and peeling off the film after being dried, is employed. Meanwhile, when cellulose diacetate is made into fibers, a dry spinning process, which comprises ejecting into blowing hot air a concentrated solution (dope) prepared by dissolving cellulose acetate in a solvent such as acetone from a nozzle having many fine holes so that the solvent is removed, is employed.

At the time of casting or spinning of the film, if an insoluble matter in the solvent of the dope is present, problems of quality of formed articles and problems pertaining to production occur. For example, the presence of an insoluble matter in the dope leads to problems in the optical properties (light transmittance, refractive index, etc.) of the film when cellulose acetate is to be used as a film, and when the cellulose acetate is to be used as fibers, it also leads to reduction in productivity due to the occurrence of fiber breaking at the time of spinning.

Accordingly, prior to casting or spinning, the dope is filtered so as to remove the insoluble matter. When the filtration is carried out, the use of a filter material having a smaller pore diameter leads to better removal of the insoluble matter. However, the use of a filter material having a smaller pore diameter tends to cause the choking of the pores and reduces the working efficiency owing to, for example, replacement of the filter material. From the foregoing, it will be appreciated that what is needed in the art is cellulose acetate which has a smaller amount of insoluble matters causing the choking and excellent filterability.

In the field of optical applications such as protective films of polarizing plates, since bright spotty matters cause optical defects, normally the filtration is carried out under strict conditions. However, leakage in filtration is sometimes inevitable because it is impossible to remove 100% of the target insoluble matters. For this reason, cellulose acetate having a smaller amount of bright spotty matters is desired from the viewpoint of minimizing the risk of the leakage that may occur.

Further, when a solution (dope) is prepared by dissolving cellulose acetate in a solvent and the dope is processed for forming, the forming may be adversely affected if the elasticity of the dope is large. For example, when a film is cast from a dope of cellulose acetate, an excessively large elasticity of the dope leads to such disadvantages as productivity reduction because of the long time required for obtaining sufficient smoothness of the dope surface after the extrusion of the dope onto a casting band and, in an extreme case, failure to obtain a film having sufficient surface smoothness. Similarly, when fibers are spun from a dope of cellulose acetate, an excessively large elasticity of the dope leads to productivity reduction because the spinning speed cannot be increased. It is therefore desirable to provide cellulose acetate having a small elasticity of the dope mainly from the viewpoint of the enhancement of productivity.

In order to fulfill such requirement by the improvement of the manufacturing process, in the manufacture of cellulose diacetate, JP-A 56-59801 discloses a technique of a high-temperature acetylation-high-temperature aging process in which an acetylation reaction is carried out at a high temperature in the range of 50 to 850° C. and hydrolysis is carried out at a high temperature in the range of 110 to 120° C. during an aging step. Meanwhile, JP-B 58-20961 discloses a high-temperature aging process in which hydrolysis is carried out at a high temperature in the range of 125 to 170° C. during an aging step.

However, none of the above-described techniques satisfactorily meet a high-level demand for quality at the time when the formed articles are used in a frontier technical field, a demand for high qualities by general consumers, and the pursuit of a high-level productivity by manufacturers.

An object of the present invention is to provide cellulose acetate which has a smaller content of insoluble matters and excellent filterability of dope, and to provide a process for producing the cellulose acetate.

Another object of the present invention is to provide cellulose acetate which leads to a dope having a small elasticity, and to provide a process for producing the cellulose acetate.

Further, the present invention provides cellulose acetate which leads to a dope whose filterability and elasticity are improved, and provides a process for producing the cellulose acetate.

DISCLOSURE OF THE INVENTION

As a means to solve the above-mentioned problems, the present inventors have already filed an application on an invention relating to cellulose triacetate whose clogging constant (K) is not more than 70 (see Japanese Patent Application No. 10-329165). The present invention relates to the improvement of this anticipatory invention.

The present inventors made intensive studies on the insoluble matters of a dope when cellulose acetate was dissolved in a solvent. As a result, they found that the amount of the insoluble matters, which are present as bright spotty matters when a film formed from the dope is observed under a polarizing microscope, has a high correlation with the choking of the pores of the filter material; the bright spotty matters are the fine fragments derived from the breakdown of insufficiently reacted cellulose fibers; and the amount of the insoluble matters in the dope can be markedly reduced by preventing these fine fragments from entering into the acetylation reaction system. Based on these findings, they accomplished the present invention.

The present invention is cellulose acetate satisfying at least one requirement selected from the following requirements (A), (B) and (C), provided that the case where (B) alone is satisfied is excluded.

Requirement (A): Bright spotty matters in sizes of 20 µm or more are not more than 20 units/mm Method of Measuring Bright Spotty Matters Cellulose acetate is dissolved in a mixed solvent consisting of methylene chloride/methanol=9/1(weight ratio) so as to obtain a solution (dope) having a concentration of 15% by weight (as solid concentration). This dope is cast onto a sheet of slide glass and dried so as to obtain a film-like sample having a thickness of about 100 µm on the slide glass. The sample is observed under a polarizing microscope in a dark visual field so as to count the number of the bright spotty matters whose maximum lengths are 20 µm or more present in an area of 32 mm$^2$. The number is calibrated based on the film thickness that is exactly measured. Thus, the number of matters per unit volume (1 mm$^3$) is obtained. Measurements in the same way as above are made for 3 films derived from different dopes. An average is calculated and the average thus obtained is defined as the number of bright spotty matters.

Requirement (B): Clogging constant (K) is not more than 60.

Method of Measuring Clogging Constant

Cellulose acetate is dissolved in a mixed solvent of methylene chloride/methanol=9/1 (weight ratio) to obtain a 16% by weight (as solid concentration) solution. The solution is then filtered under a constant pressure at the filtration pressure of 294 kPa (3 kg/cm$^2$) and the temperature of 25° C. using a muslin filter to determine a filtered volume with the lapse of time, from which the slope of a linear curve represented by t/V-t (wherein t is a filtration time (sec) and V is a filtered volume (ml)) is calculated to obtain an clogging constant (K) where K=slope×2×10$^4$.

Requirement (C): The ratio (G'/G") of storage modulus (G') to loss modulus (G") at a measuring frequency of 0.016 Hz is not more than 0.2.

Method of Measuring Kinematic Viscoelasticity

A solution is prepared by dissolving 15.5 parts by weight of cellulose acetate, 1.5 parts by weight of triphenyl phosphate, and 0.9 parts by weight of diphenyl phosphate in 69.8 parts by weight of methylene chloride and 12.3 parts by weight of methanol. The kinematic viscoelasticities (G' and G") of this solution are measured at 25° C. Herein, UDS200 manufactured by Paar Physica Corporation can be used.

The present invention includes cellulose acetate satisfying the requirements (A) and (B), (A) and (C), or (B) and (C). Further, it also includes cellulose acetate satisfying the requirement (C) and cellulose acetate satisfying the requirements (A), (B) and (C).

As to the requirement (A), it is preferable that bright spotty matters in sizes of 20 µm or more are not more than 10 units/mm$^3$. As to (C), G'/G" is preferably not more than 0.1. Further, G'/G" is also preferably not more than 0.06.

The present invention also provides a process for producing the above-mentioned cellulose acetate, from a process comprising a pretreatment step in which cellulose is treated with acetic acid, a transfer step in which the pretreated cellulose is transferred to an acetylation reaction system, and an acetylation reaction step, which comprises the step of washing down the pretreated cellulose adhering to the transferring pathway into the acetylation reaction system with acetic acid or a mixed liquid of acetic acid and acetic anhydride prior to the start of the acetylation reaction.

It is preferable that the amount of the acetic acid or a mixed liquid consisting of acetic acid and acetic anhydride, which is used in the washing, is in the range of 5 to 50 parts by volume to 100 parts by weight of cellulose as a starting material.

In the present invention, cellulose acetate means cellulose triacetate and/or cellulose diacetate.

Mode for Carrying Out the Invention

Of the requirements (A) to (C) described above, cellulose acetate of the present invention satisfies the requirement (A), the requirements (A) and (B), the requirement (C), or a set of the requirements (A), (B) and (C).

As to the requirement (A), the bright spotty matters in sizes of 20 µm or more are not more than 20 units/mm$^3$, and preferably not more than 10 units/mm$^3$.

As to the requirement (B), the clogging constant (K) is not more than 60, and preferably not more than 50.

As to the requirement (C), the ratio (G'/G") of storage modulus (G') to loss modulus (G") at a measuring frequency of 0.016 Hz is not more than 0.2, preferably not more than 0.1, and more preferably not more than 0.06.

If the requirement (A) or the requirements (A) and (B) are satisfied, filterability is raised and, for example, the matters, which adversely affect the spinning step, can be easily removed by filtration. In particular, the reduction in the number of bright spotty matters enables the reduction of the risks of leakage in filtration when the cellulose acetate is to be used in optical applications such as protective films of polarizing plates.

If the requirement (C) is satisfied, the speed of film casting and the spinning speed can be raised so that the productivity is raised because the elasticity of dope can be held to a low value.

If the requirements (A), (B) and (C) are satisfied, the above-mentioned effects can be obtained.

Next, the process for producing the cellulose acetate of the present invention is explained. The process for producing the cellulose acetate of the present invention is characterized by the transfer step in which pretreated cellulose is transferred to an acetylation reaction step. The treatments, which precede or follow the transfer step, may be the same as those in a conventional process for producing cellulose acetate. Hereinafter, the process for producing the cellulose acetate of the present invention is explained in the order of the steps.

First, beaten cellulose, e.g., wood pulp, as a starting material is pretreated for activation by the addition thereto of acetic acid. The amount of the acetic acid to be used in this pretreatment for activation is preferably 10 to 500 parts by weight to 100 parts by weight of cellulose. A preferred condition for the pretreatment for activation is 20 to 50° C. for 0.5 to 2 hours in a sealed state and under stirring.

Next comes the transfer step. In this step, the pretreated cellulose is transferred to an acetylation reaction system and, at the same time, the pretreated cellulose adhering to the transferring pathway is washed down (i.e., cleaning) into an acetylation reaction system.

The transfer apparatus constituting the transfer pathway of the transfer step preferably has in the inside thereof one or two dampers. Besides, a duct, which is equipped with a liquid-spraying means such as one or two, or more, liquid-spraying nozzles may also be used.

As to the acetic acid or a mixture of acetic acid and acetic anhydride used in the transfer step as the washing liquid, in the case of acetic acid, glacial acetic acid is used, while in the case of a mixture of acetic acid and acetic anhydride, the weight ratio of acetic acid to acetic anhydride is preferably 1:99 to 99:1 and more preferably 40:60 to 60:40.

The amount of the washing liquid is preferably 5 to 50 parts by volume, more preferably 10 to 50 parts by volume, and most preferably 15 to 50 parts by volume, based on 100 parts by weight of cellulose used. The amount of 5 parts or more by volume leads to efficient washing down of adhering pretreated cellulose and the amount of 50 parts or less by volume prevents the washing time from becoming excessively long.

The temperature of the washing liquid is preferably 15 to 50° C., more preferably 15 to 40° C., and most preferably 15 to 30° C.

The washing method is not particularly limited in so far as it is a method capable of washing down the pretreated cellulose adhering to the transfer pathway. Examples of the method that can be used include a method in which the washing liquid is sprayed and a method in which the washing liquid is introduced in a state of a shower.

Next step is an acetylation reaction. The amount of the acetic acid and acetic anhydride to be used in the acetylation reaction step, including the amount of acetic acid or a mixture of acetic acid and acetic anhydride to be added in the preceding transfer step, comprises preferably 200 to 400 parts by weight, more preferably 240 to 280 parts by weight, of acetic anhydride and preferably 300 to 600 parts by weight, more preferably 350 to 500 parts by weight, of acetic acid, to 100 parts by weight of cellulose.

The amount of sulfuric acid as a catalyst to be added is preferably 5 to 15 parts by weight to 100 parts by weight of cellulose.

The acetylation reaction is carried out preferably as follows. After the addition of the above-mentioned reactants, the temperature of the reaction mixture is raised at a nearly constant rate under stirring over a period of 40 to 90 minutes and finally the reaction mixture is held at 30 to 55° C. for 15 to 60 minutes.

Next is an aging step. The aging is carried out preferably as follows. All or part of the sulfuric acid catalyst in the acetylation reaction system is neutralized and the temperature of the system is set to 50 to 150° C. and the system is kept at a temperature within that temperature range for 15 minutes to 2 hours. In this way, cellulose acetate having a desired acetylation degree is obtained.

Subsequently, the reaction mixture is poured into a dilute aqueous solution of acetic acid and recovered as a precipitate. The precipitate is washed with water and then dried, to give the final product.

Although the producing process according to the present invention exhibits a remarkable effect in the manufacture of any of cellulose triacetate and cellulose diacetate, the effect is remarkable particularly in the manufacture of cellulose triacetate.

The cellulose acetate of the present invention, which satisfies certain combinations of the requirements (A), (B) and (C), can improve filterability, number of bright spotty matters, elasticity of dope etc. Therefore, if the cellulose acetate is to be used in such application as films, films that exhibit high optical performances can be produced in a stable manner.

The producing process of the present invention makes it possible to produce the above-mentioned cellulose acetate in an industrially stable manner.

EXAMPLES

Hereinafter, Examples are shown to describe the present invention in detail. However, the present invention is not limited the Examples shown below. The measurement of properties of the cellulose acetate was conducted in the following methods.

(1) Acetylation Degree

Acetylation degree was measured in accordance with the method of measuring acetylation degree of ASTM: D-817-91 (Testing Methods for cellulose acetate etc.). First, weigh out exactly 1.9 g of dried cellulose acetate and dissolve it in 150 ml of a mixed solvent of acetone and dimethyl sulfoxide (4:1 in volume ratio). Then, 30 ml of IN sodium hydroxide aqueous solution was added thereto, followed by saponifying at 25° C. for 2 hours. Next, phenolphthalein solution was added as an indicator and the excess sodium hydroxide was titrated with 1N sulfuric acid. Then, the acetylation degree was calculated according to the following equation. Besides, carry out a blank test in the same way as above.

$$\text{Acetylation degree } (\%) = [6.005 \times (B-A) \times F]/W$$

in which A is the volume (ml) of 1N sulfuric acid required for the titration of the sample; B is the volume (ml) of 1N sulfuric acid required for the blank test; F is the concentration factor of 1N sulfuric acid; and W is the weight of the sample.

(2) 6% Viscosity 6.0 g of a dried sample and 94.0 ml of a mixed solvent of methylene chloride and methanol=91/9 (in weight ratio) were placed in an Erlenmeyer flask. The flask was sealed and stirred for about 1 hour. Then, the sample was completely dissolved by shaking for about 1 hour in a rotary shaker. The resulting 6 wt/vol % solution was transferred into a predetermined Ostwald viscometer up to the mark and the temperature was adjusted to 25±1° C. for about 30 minutes. The time of downward flowing required to pass through marked lines was determined and the 6% viscosity was calculated according to the following equation:

$$6\% \text{ viscosity (mpas)} = \text{time of downward flowing } (s) \times \text{viscometer coefficient}$$

The viscometer coefficient was determined from the following equation after the time of downward flowing was measured, by using of a standard solution for viscometer calibration, in the same manner as above The viscometer coefficient was determined by measuring the time of downward flowing by using a standard solution for viscometer calibration according to the same procedure as above and by the calculation according to the following equation:

$$\text{The viscometer coefficient} = \frac{\text{absolute viscosity of the standard solution (mPa·s)} \times \frac{\text{density of the solution } (1.235 \text{ g/cm}^3)}{\text{time}(s) \text{ of downward flowing required for the standard solution}}}{\text{density of the standard solution (g/cm}^3)}$$

(3) Amount of Insoluble Matters

Dissolve cellulose acetate in a mixed solution of methylene chloride and methanol (9:1 in weight ratio) so that the solid concentration comes to 2%. Filter the resulting solution (dope) through a glass filter (G-4 having pore diameters in the range of 5 to 10 μm, manufactured by Sohgo Rikagaku Garasu Seisakusho Co., Ltd.). Then, sufficiently wash and remove the dope adhering to the filtration residue using a mixed solvent of methylene chloride and methanol (9:1 in weight ratio). The glass filter with the filtration residue is dried until the weight becomes constant. Measure the weights of the glass filter before and after the filtration and calculate the amount of insoluble matters according to the following equation:

$$\text{Amount of insoluble matters (\%)} = \frac{\text{weight of the glass filter after filtration (g)} - \text{weight of the glass filter after filtration (g)}}{\text{weight of cellulose acetate (g)}} \times 100$$

Example 1

100 Parts by weight of a cellulose pulp was sprayed with 50 parts by weight of glacial acetic acid to effect a pretreatment activation. This pretreated cellulose was transferred to an acetylator by means of a transferring apparatus and the pretreated cellulose adhering to the interior of the transferring apparatus was washed down with 10 parts by volume of glacial acetic acid into the acetylator.

Subsequently, 410 parts by weight of glacial acetic acid, 260 parts by weight of acetic anhydride and 8 parts by weight of sulfuric acid were added to effect an acetylation treatment.

After the completion of the acetylation, the acetic anhydride was decomposed by adding a 15% by weight solution of magnesium acetate in an acetic acid/water mixed solvent until the concentration of water in the solution became 3.0% by weight and the concentration of sulfate ion became 0.5% by weight so that the acetylation reaction stopped. Then, aging was carried out by blowing superheated steam into the system and adjusting temperature and time. Subsequently, purification and drying were carried out according to a conventional method, to give a flaky cellulose acetate.

Example 2

100 Parts by weight of a cellulose pulp was sprayed with 50 parts by weight of glacial acetic acid to effect a pretreatment activation. This pretreated cellulose was transferred to an acetylator by means of a transferring apparatus and the pretreated cellulose adhering to the interior of the transferring apparatus was washed down with 10 parts by volume of glacial acetic acid into the acetylator.

Subsequently, 410 parts by weight of glacial acetic acid, 260 parts by weight of acetic anhydride and 8 parts by weight of sulfuric acid were added to effect an acetylation treatment.

After the completion of the acetylation, the acetic anhydride was decomposed by adding a 15% by weight solution of magnesium acetate in an acetic acid/water mixed solvent until the concentration of water in the solution became 3.0% by weight and the concentration of sulfate ion became 0.5% by weight so that the acetylation reaction stopped. After that, aging was carried out for a predetermined time period at the temperature attained by the reaction heat evolving from water and acetic anhydride at the time when the reaction stopped. Subsequently, purification and drying were carried out according to a conventional method, to give a flaky cellulose acetate.

Example 3

100 Parts by weight of a cellulose pulp was sprayed with 50 parts by weight of glacial acetic acid to effect a pretreatment activation. This pretreated cellulose was transferred to an acetylator by means of a transferring apparatus and the pretreated cellulose adhering to the interior of the transferring apparatus was washed down with 10 parts by volume of glacial acetic acid into the acetylator.

Subsequently, 405 parts by weight of glacial acetic acid, 260 parts by weight of acetic anhydride and 8 parts by weight of sulfuric acid were added to effect an acetylation treatment.

After the completion of the acetylation, the acetic anhydride was decomposed by adding a 15% by weight solution of magnesium acetate in an acetic acid/water mixed solvent until the concentration of water in the solution because 3.0% by weight and the concentration of sulfate ion became 0.5% by weight so that the acetylation reaction stopped. Then, aging was carried out by blowing superheated steam into the system and adjusting the temperature and time. Subsequently, purification and drying were carried out according to a conventional method, to give a flaky cellulose acetate.

Example 4

100 Parts by weight of a cellulose pulp was sprayed with 50 parts by weight of glacial acetic acid to effect a pretreatment activation. This pretreated cellulose was transferred to an acetylator by means of a transferring apparatus and the pretreated cellulose adhering to the interior of the transferring apparatus was washed down with 10 parts by volume of glacial acetic acid into the acetylator.

Subsequently, 405 parts by weight of glacial acetic acid, 260 parts by weight of acetic anhydride and 8 parts by weight of sulfuric acid were added to effect an acetylation treatment.

After the completion of the acetylation, the acetic anhydride was decomposed by adding a 15% by weight solution of magnesium acetate in an acetic acid/water mixed solvent until the concentration of water in the solution became 3.0% by weight and the concentration of sulfate ion became 0.5% by weight so that the acetylation reaction stopped. After that, aging was carried out for a predetermined time period at the temperature attained by the reaction heat evolving from water and acetic anhydride at the time when the reaction stopped. Subsequently, purification and drying were carried out according to a conventional method, to give a flaky cellulose acetate.

Example 5

100 Parts by weight of a cellulose pulp was sprayed with 50 parts by weight of glacial acetic acid to effect a pretreatment activation. This pretreated cellulose was transferred to an acetylator by means of a transferring apparatus and the pretreated cellulose adhering to the interior of the transferring apparatus was washed down with 20 parts by volume of a 50/50 (in weight ratio) mixture of glacial acetic acid/acetic anhydride into the acetylator. Subsequently, 410 parts by weight of glacial acetic acid, 250 parts by weight of acetic anhydride and 8 parts by weight of sulfuric acid were added to effect an acetylation treatment.

After the completion of the acetylation, the acetic anhydride was decomposed by adding a 15% by weight solution of magnesium acetate in an acetic acid/water mixed solvent until the concentration of water in the solution became 3.0% by weight and the concentration of sulfate ion became 0.5% by weight so that the acetylation reaction stopped. After that, aging was carried out for a predetermined time period at the temperature attained by the reaction heat evolving from water and acetic anhydride at the time when the reaction stopped. Subsequently, purification and drying were carried out according to a conventional method, to give a flaky cellulose acetate.

Example 6

100 Parts by weight of a cellulose pulp was sprayed with 50 parts by weight of glacial acetic acid to effect a pretreatment activation. This pretreated cellulose was transferred to an acetylator by means of a transferring apparatus and the pretreated cellulose adhering to the interior of the transferring apparatus was washed down with 30 parts by volume of a 60/40 (in weight ratio) mixture of glacial acetic acid/acetic anhydride into the acetylator. Subsequently, 400 parts by weight of glacial acetic acid, 250 parts by weight of acetic anhydride and 8 parts by weight of sulfuric acid were added to effect an acetylation treatment.

After the completion of the acetylation, the acetic anhydride was decomposed by adding a 15% by weight solution of magnesium acetate in an acetic acid/water mixed solvent until the concentration of water in the solution became 3.0% by weight and the concentration of sulfate ion became 0.5% by weight so that the acetylation reaction stopped. Then, aging was carried out by blowing superheated steam into the system and adjusting the temperature and time. Subsequently, purification and drying were carried out according to a conventional method, to give a flaky cellulose acetate.

Example 7

100 Parts by weight of a cellulose pulp was sprayed with 50 parts by weight of glacial acetic acid to effect a pretreatment activation. This pretreated cellulose was transferred to an acetylator by means of a transferring apparatus and the pretreated cellulose adhering to the interior of the transferring apparatus was washed down with 30 parts by volume of a 60/40 (in weight ratio) mixture of glacial acetic acid/acetic anhydride into the acetylator. Subsequently, 400 parts by weight of glacial acetic acid, 250 parts by weight of acetic anhydride and 8 parts by weight of sulfuric acid were added to effect an acetylation treatment.

After the completion of the acetylation, the acetic anhydride was decomposed by adding a 15% by weight solution of magnesium acetate in an acetic acid/water mixed solvent until the concentration of water in the solution became 3.0% by weight and the concentration of sulfate ion became 0.5% by weight so that the acetylation reaction stopped. After that, aging was carried out for a predetermined time period at the temperature attained by the reaction heat evolving from water and acetic anhydride at the time when the reaction stopped. Subsequently, purification and drying were carried out according to a conventional method, to give a flaky cellulose acetate.

Comparative Example 1

100 Parts by weight of a cellulose pulp was sprayed with 50 parts by weight of glacial acetic acid to effect a pretreatment activation. This pretreated cellulose was transferred to an acetylator by means of a transferring apparatus, and then 420 parts by weight of glacial acetic acid, 260 parts by weight of acetic anhydride and 8 parts by weight of sulfuric acid were added to effect an acetylation treatment without washing down the pretreated cellulose adhering to the interior of the transferring apparatus.

After the completion of the acetylation, the acetic anhydride was decomposed by adding a 15% by weight solution of magnesium acetate in an acetic acid/water mixed solvent until the concentration of water in the solution became 3.0% by weight and the concentration of sulfate ion became 0.5% by weight so that the acetylation reaction stopped. After that, aging was carried out for a predetermined time period at the temperature attained by the reaction heat evolving from water and acetic anhydride at the time when the reaction stopped. Subsequently, purification and drying were carried out according to a conventional method, to give a flaky cellulose acetate.

Comparative Example 2

100 Parts by weight of a cellulose pulp was sprayed with 50 parts by weight of glacial acetic acid to effect a pretreatment activation. This pretreated cellulose was transferred to an acetylator by means of a transferring apparatus, and then 420 parts by weight of glacial acetic acid, 260 parts by weight of acetic anhydride and 8 parts by weight of sulfuric acid were added to effect an acetylation treatment without washing down the pretreated cellulose adhering to the interior of the transferring apparatus.

After the completion of the acetylation, the acetic anhydride was decomposed by adding a 15% by weight solution of magnesium acetate in an acetic acid/water mixed solvent until the concentration of water in the solution became 3.0% by weight and the concentration of sulfate ion became 0.5% by weight so that the acetylation reaction stopped. Then, aging was carried out by blowing superheated steam into the system and adjusting temperature and time. Subsequently, purification and drying were carried out according to a conventional method, to give a flaky cellulose acetate.

TABLE 1

|  | Example | | | | | | | Comparative Example | |
| --- | --- | --- | --- | --- | --- | --- | --- | --- | --- |
|  | 1 | 2 | 3 | 4 | 5 | 6 | 7 | 1 | 2 |
| Acetylation degree | 61.2 | 60.7 | 60.9 | 60.8 | 60.8 | 60.9 | 60.9 | 60.8 | 60.8 |
| 6% viscosity (mPas) | 313 | 305 | 434 | 351 | 322 | 345 | 338 | 362 | 303 |
| Amount of insoluble matter (wt %) | 0.02 | 0.02 | 0.02 | 0.02 | 0.02 | 0.02 | 0.02 | 0.030 | 0.04 |
| Bright spotty matters (Unit/mm$^3$) | 18 | 16 | 18 | 13 | 12 | 9 | 6 | 23 | 24 |
| Clogging constant | 56.2 | 52.5 | 50.0 | 45.1 | 45.0 | 33.0 | 26.9 | 61.4 | 82.2 |
| G'/G" | 0.16 | 0.08 | 0.04 | 0.05 | 0.04 | 0.04 | 0.04 | 0.22 | 0.23 |

As shown in Table 1, the present invention enabled the manufacture of cellulose acetate having excellent filterability.

We claim:

1. A cellulose acetate satisfying (B) and at least one of (A) and (C):
   (A) bright spotty matters in sizes of at least 20 μm are not more than 20 units/mm$^3$;
   (B) clogging constant K is not more than 60; and
   (C) ratio G'/G" of storage modulus G' to loss modulus G" at a measuring frequency of 0.016 Hz is not more than 0.2.

2. The cellulose acetate according to claim 1, which also satisfies (A), (A) and (C), or (C).

3. The cellulose acetate according to claim 1, which also satisfies (C).

4. The cellulose acetate according to claim 1, which satisfies (A), (B) and (C).

5. The cellulose acetate according to claim 3, wherein G'/G" of (C) is not more than 0.1.

6. The cellulose acetate according to claim 3, wherein G'/G" of (C) is not more than 0.06.

7. A process for producing a cellulose acetate satisfying (B) and at least one of (A) and (C):
   (A) bright spotty matters in sizes of at least 20 μm are not more than 20 units/mm$^3$;
   (B) clogging constant K is not more than 60; and
   (C) ratio G'/G" of storage modulus G' to loss modulus G" at a measuring frequency of 0.016 Hz is not more than 0.2,
   comprising the steps of:
   pretreating cellulose with acetic acid;
   transferring the pretreated cellulose to an acetylation reaction system through a transferring pathway;
   washing the pretreated cellulose adhering to the transferring pathway into the acetylation reaction system with acetic acid or a mixed liquid of acetic acid and acetic anhydride; and
   conducting an acetylation reaction on the pretreated cellulose.

8. The process according to claim 7, wherein the amount of the acetic acid or a mixed solution of acetic acid and acetic anhydride, which is used in the washing, is in the range of 5 to 50 parts by volume to 100 parts by weight of cellulose as a starting material.

9. The process according to claim 7, wherein the cellulose acetate is cellulose triacetate.

10. A cellulose acetate having bright spotty matters in sizes of at least 20 μm or more of not more than 10 units/mm$^3$.

* * * * *